(12) United States Patent
Oguma et al.

(10) Patent No.: US 10,802,778 B2
(45) Date of Patent: Oct. 13, 2020

(54) INFORMATION PROCESSING APPARATUS, INFORMATION PROCESSING SYSTEM AND INFORMATION PROCESSING METHOD FOR EXECUTING DOCUMENT READING PROCESSING

(71) Applicant: KYOCERA Document Solutions Inc., Osaka (JP)

(72) Inventors: Takashi Oguma, Osaka (JP); Toru Yasui, Osaka (JP); Manuel Manalo, Osaka (JP); Chikara Yuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 102 days.

(21) Appl. No.: 15/827,535

(22) Filed: Nov. 30, 2017

(65) Prior Publication Data

US 2018/0150265 A1 May 31, 2018

(30) Foreign Application Priority Data

Nov. 30, 2016 (JP) ................................ 2016-233052

(51) Int. Cl.
*G06F 3/12* (2006.01)
*G03G 15/00* (2006.01)
(Continued)

(52) U.S. Cl.
CPC ......... *G06F 3/126* (2013.01); *G03G 15/5075* (2013.01); *G03G 15/5083* (2013.01);
(Continued)

(58) Field of Classification Search
CPC .............................. G06F 3/126; G06F 3/1226
See application file for complete search history.

(56) References Cited

U.S. PATENT DOCUMENTS

2004/0190042 A1* 9/2004 Ferlitsch ............... G06F 3/1285
358/1.15
2006/0028672 A1* 2/2006 Abiko ..................... G06F 3/121
358/1.14
(Continued)

FOREIGN PATENT DOCUMENTS

JP 2006-343955 A 12/2006

OTHER PUBLICATIONS

"What is a network?", 2013, retrieved from https://fcit.usf.edu/network/chap1/chap1.htm on Nov. 22, 2019.*

*Primary Examiner* — Philip Wang
(74) *Attorney, Agent, or Firm* — Hawaii Patent Services; Nathaniel K. Fedde; Kenton N. Fedde

(57) ABSTRACT

Provided is an information processing apparatus that efficiently executes a series of tasks related to reading a document. An information processing system includes an upstream server, image forming apparatuses and a regional server. An apparatus-information-acquiring unit of the upstream server acquires apparatus information from plural image forming apparatuses. A task-sharing unit shares the respective tasks of a series of tasks for document data that is read by a specified image forming apparatus, based on a storage unit that is an apparatus-information-storage unit that stores an ID, position information that indicates a position in a network, and performance information for that image forming apparatuses that is included in the apparatus information. The task-sharing unit, in accordance with the ID and performance information of plural image forming apparatuses, determines and shares tasks so as to be executed by image forming apparatuses that are at nearby positions in the network.

6 Claims, 7 Drawing Sheets

(51) Int. Cl.
*H04N 1/00* (2006.01)
*H04N 1/32* (2006.01)

(52) U.S. Cl.
CPC .......... *G06F 3/1221* (2013.01); *G06F 3/1226* (2013.01); *G06F 3/1229* (2013.01); *G06F 3/1285* (2013.01); *H04N 1/00244* (2013.01); *H04N 1/00344* (2013.01); *H04N 1/00347* (2013.01); *H04N 1/3255* (2013.01); *G06F 2206/1508* (2013.01); *H04N 2201/0094* (2013.01)

(56) References Cited

U.S. PATENT DOCUMENTS

| | | | |
|---|---|---|---|
| 2006/0279766 A1* | 12/2006 | Kobayashi | G03G 15/5075 358/1.14 |
| 2007/0091356 A1* | 4/2007 | Kremer | G06F 3/1214 358/1.15 |
| 2009/0033976 A1* | 2/2009 | Ding | G06F 3/1288 358/1.15 |
| 2009/0040554 A1* | 2/2009 | Burke | G06F 3/126 358/1.15 |
| 2009/0174898 A1* | 7/2009 | Ono | G06F 3/1263 358/1.15 |
| 2011/0058202 A1* | 3/2011 | St. Jacques, Jr. | H04N 1/32502 358/1.13 |
| 2011/0170130 A1 | 7/2011 | Kobayashi | |
| 2012/0147420 A1* | 6/2012 | Nishimi | G06F 3/1204 358/1.15 |
| 2012/0194852 A1* | 8/2012 | Chen | G06F 3/1263 358/1.15 |
| 2014/0185084 A1* | 7/2014 | Cudak | G06F 3/126 358/1.15 |
| 2016/0253131 A1* | 9/2016 | Uemura | H04N 1/00689 358/1.15 |
| 2017/0208182 A1* | 7/2017 | Hur | H04N 1/32101 |
| 2017/0277480 A1* | 9/2017 | Sarigumba | G06F 3/1285 |
| 2018/0150264 A1* | 5/2018 | Oguma | G03G 15/5075 |

* cited by examiner

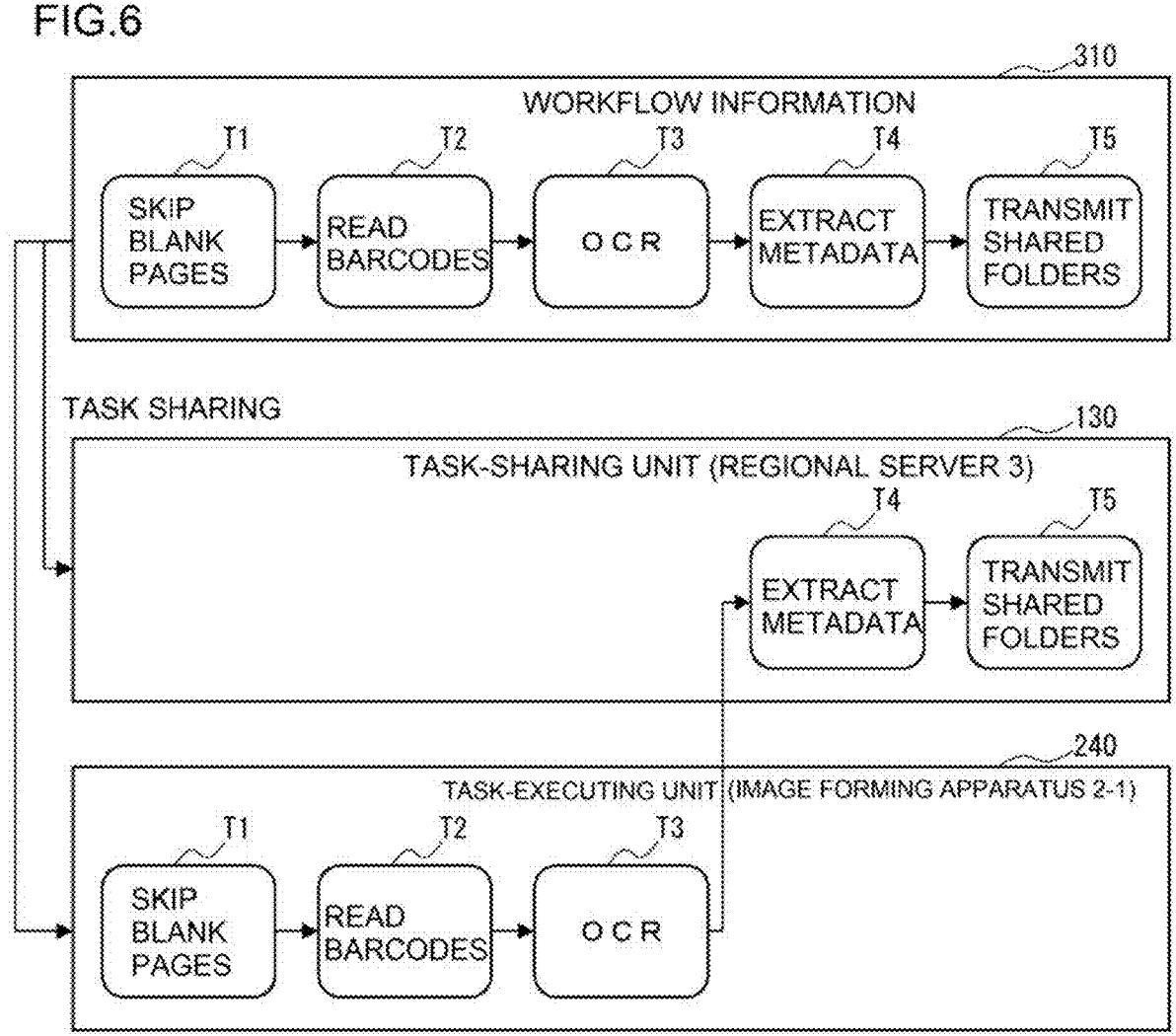

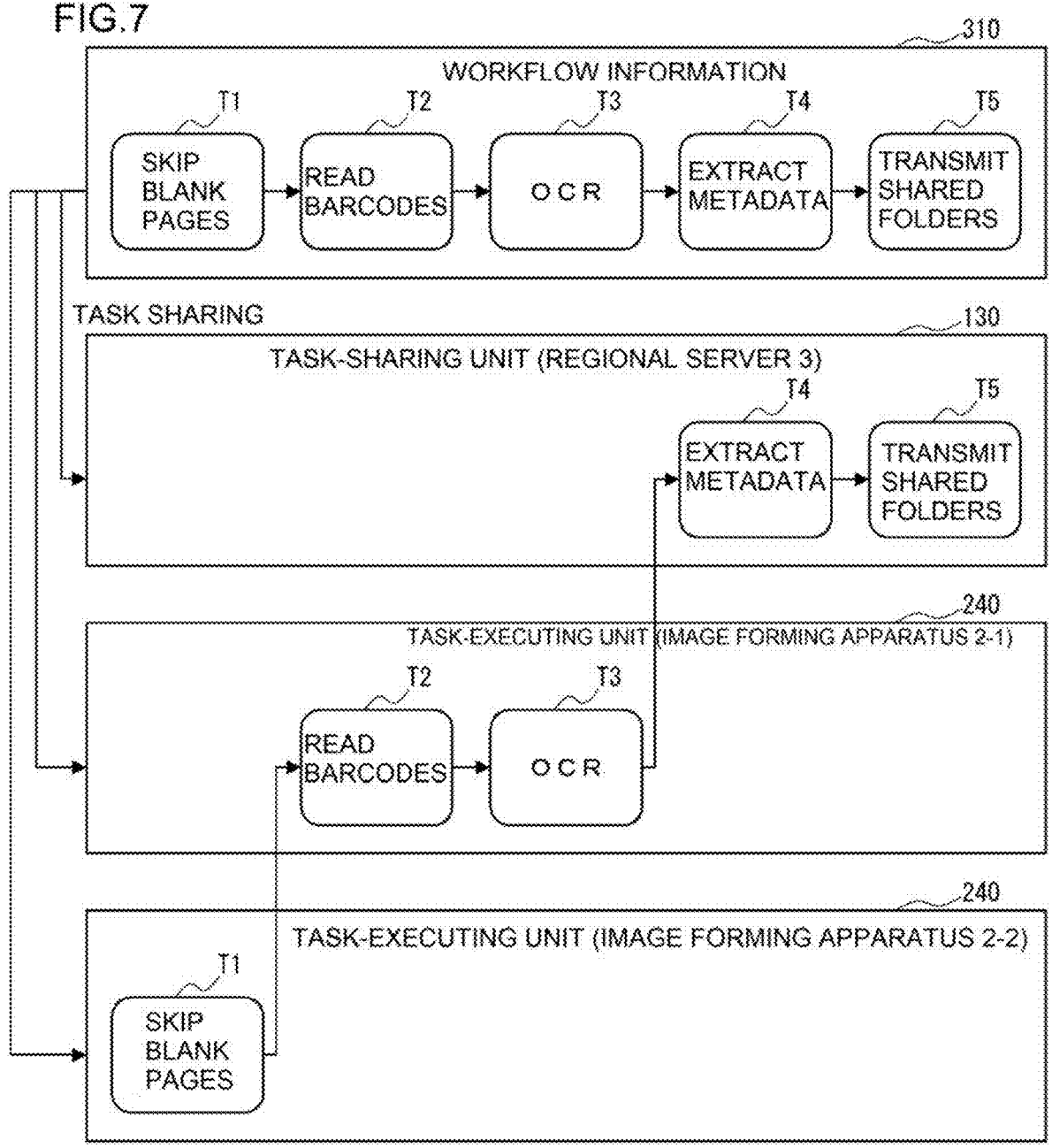

INFORMATION PROCESSING APPARATUS, INFORMATION PROCESSING SYSTEM AND INFORMATION PROCESSING METHOD FOR EXECUTING DOCUMENT READING PROCESSING

INCORPORATION BY REFERENCE

This application is based on and claims the benefit of priority from Japanese Patent Application No. 2016-233052 filed on Nov. 30, 2016, the contents of which are hereby incorporated by reference.

BACKGROUND

The present disclosure relates to an information processing apparatus, an information processing system and an information processing method, and more particularly, relates to an information processing apparatus, an information processing system and an information processing method for executing a document reading process.

Conventionally, there are image forming apparatuses such as multifunctional peripherals (MFP) and the like that are capable of printing text and images.

On the other hand, in typical technology a dynamic job scheduler (DJS) of a server that is connected to a computer network and that manages distributed processing by plural printers having a power saving mode acquires apparatus information and operation status of the respective printers. There is also a system, that based on the apparatus information and the operation status, selects a target apparatus for distributed processing, and notifies the task manager (TM) of the client PC that is the requesting source for distributed processing.

In the typical technology above, it is possible to perform distributed processing by taking into consideration the power-saving mode of the apparatuses, and switching to the power-saving mode.

SUMMARY

The information processing apparatus according to the present disclosure is an information processing apparatus that is capable of connecting to a document reading apparatus. The information processing apparatus includes an apparatus-information-storage unit and a task-sharing unit. The apparatus-information-storage unit stores performance information, an ID, and position on a network of plural document reading apparatuses. The task-sharing unit determines and shares a series of tasks for data of a document that is read by a specified document reading apparatus so that the respective tasks are executed by apparatuses that are at nearby positions in the network. The task-sharing unit may determine and share tasks in accordance with the ID and the performance information of the plural document reading apparatuses stored in the apparatus-information-storage unit.

The information processing system according to the present disclosure is an image processing system that includes a document reading apparatus and an information processing apparatus that is capable of connecting to the document reading apparatus. The document reading apparatus includes an apparatus-information-transmitting unit that transmits apparatus information that includes performance information, an ID, and position information on a network of the document reading apparatus in accordance with a request from the information processing apparatus. The information processing apparatus includes an apparatus-information-acquiring unit, an apparatus-information-storage unit, and a task-sharing unit. The apparatus-information-acquiring unit acquires the apparatus information from plural document reading apparatuses. The apparatus-information-storage unit stores the plurality of apparatus information that is acquired by the apparatus-information-acquiring unit. The task-sharing unit determines and shares a series of tasks for data of a document that is read by a specified document reading apparatus so that the respective tasks are executed by apparatuses that are at a nearby positions in the network. The task-sharing unit may determine and share tasks in accordance with the ID and the performance information of the plural document reading apparatuses stored in the apparatus-information-storage unit.

The information processing method according to the present disclosure is an information processing method that is executed by an information processing apparatus that is capable of connecting to a document reading apparatus. The information processing method causes an information processing apparatus to store performance information, an ID and position on a network of the plural document reading apparatuses. Then, the information processing method causes an information processing apparatus to determine and share execution of the respective tasks of a series of tasks for data of a document that is read by the specified document reading apparatus so that the apparatus at the nearby position in the network executes a task in accordance with the ID and the performance information that are stored in each of the plural document reading apparatuses.

BRIEF DESCRIPTION OF THE DRAWINGS

FIG. 6 is a conceptual diagram of an example of executing the task sharing execution process illustrated in FIG. 5.

FIG. 7 is a conceptual diagram of an example of executing the task sharing execution process illustrated in FIG. 5.

DETAILED DESCRIPTION

<Embodiments>
[System Configuration of Information Processing System X]

First, the system configuration of information processing system X will be explained with reference to FIG. 1 to FIG. 3.

The information processing system X of an embodiment according to the present disclosure includes an upstream server 1, image forming apparatuses 2-1 to 2-n, a regional server 3, and networks 5a, 5b, 5c, . . . that connect these.

Figure 1:
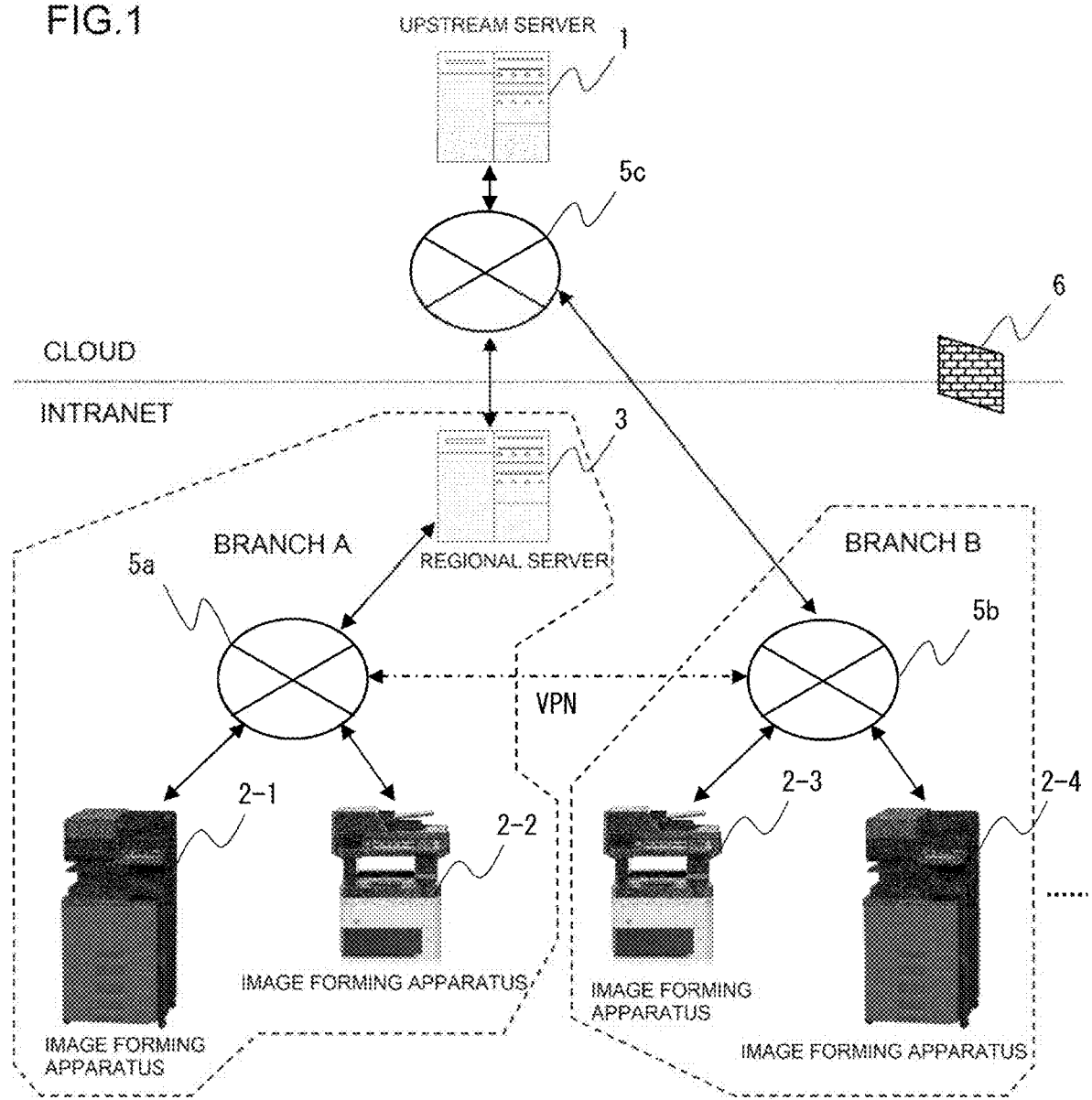
FIG. 1 is a system configuration diagram of an information processing system of an embodiment of an image forming apparatus according to the present disclosure.

In the configuration example of the information processing system X of the embodiment illustrated in FIG. 1, the image forming apparatuses 2-1, 2-2 and the regional server 3 are connected to an intranet (regional network) network 5a as "branch (A)". Moreover, image forming apparatus 2-3, 2-4 are connected to a separate intranet network 5b as "branch (B)". These networks, network 5a and network 5b, are connected to network 5c via a router or gateway that includes a firewall 6 for which specified rules are set and that allows packets and the like of a specified port to pass. Network 5c is a WAN (Wide Area Network). Moreover, an upstream server 1 is connected to the network 5c. In other words, the upstream server 1 is a server on a so-called "cloud". Furthermore, a VPN (Virtual Private Network) is configured between the network 5a and the network 5b.

Figure 3:
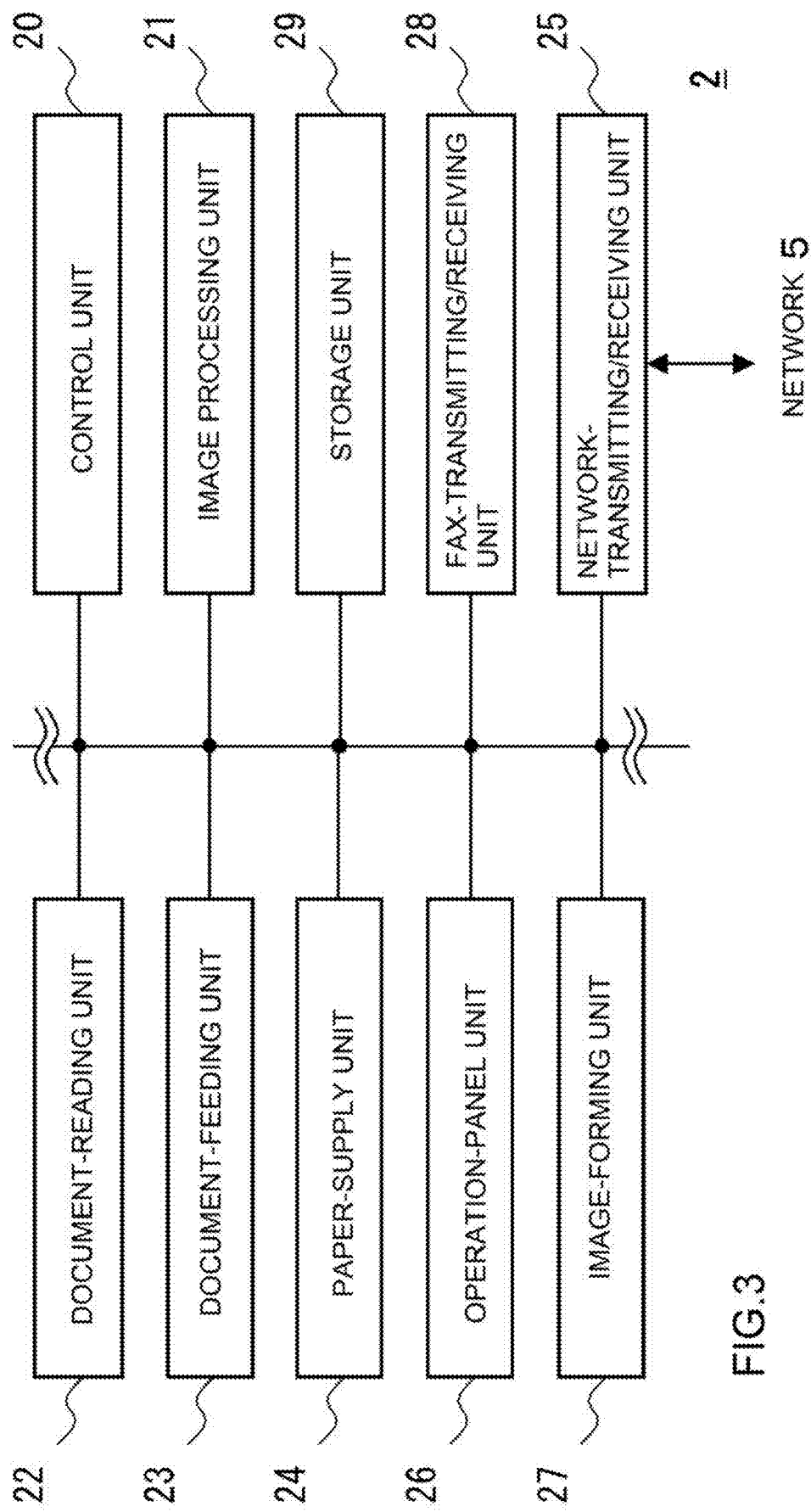
FIG. 3 is a block diagram illustrating the control configuration of the image forming apparatus illustrated in FIG. 1.
Figure 4:
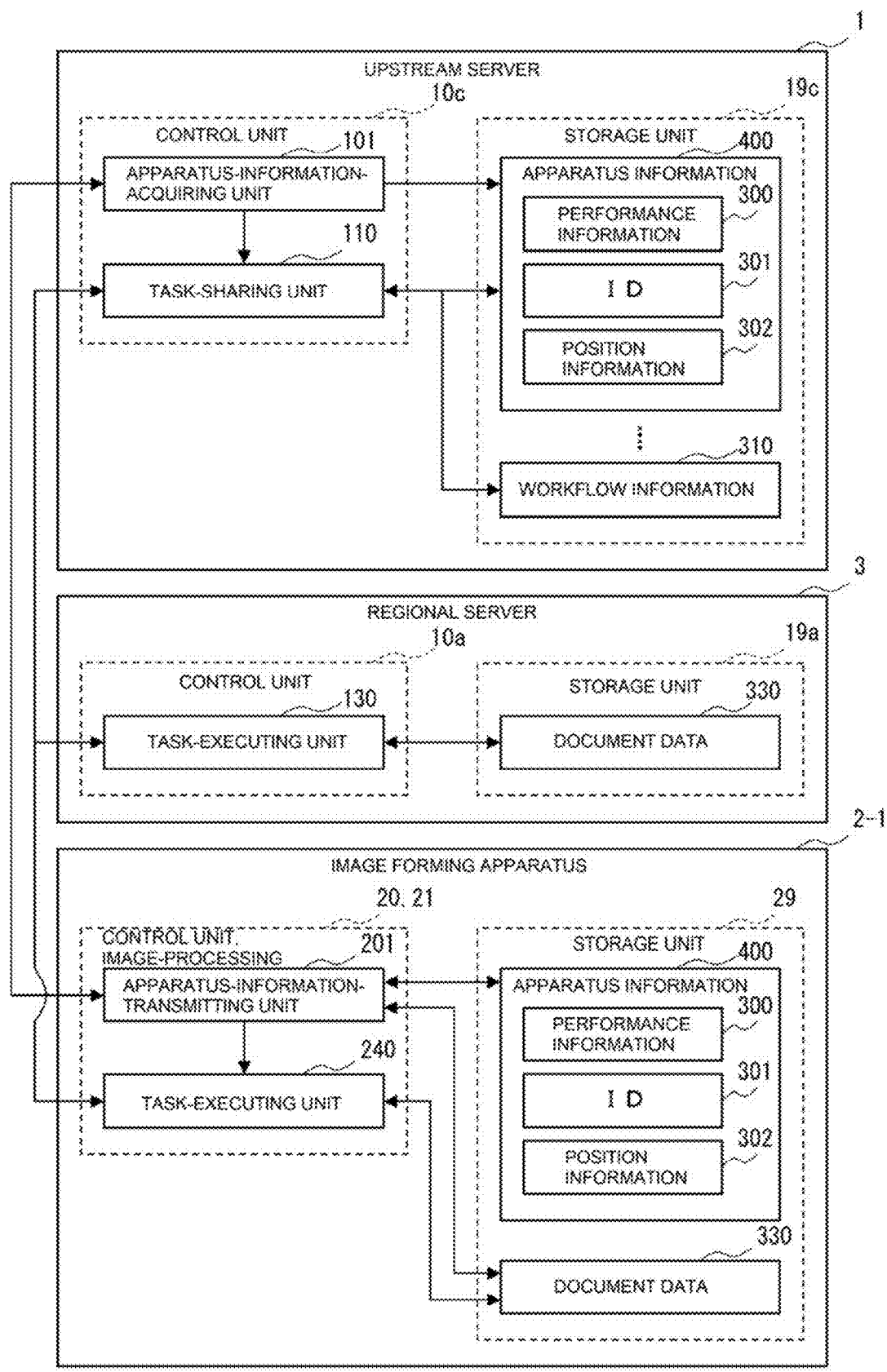
FIG. 4 is a block diagram illustrating the functional configuration of the information processing system illustrated in FIG. 1.

In the following, when indicating an image forming apparatus 2-1, ..., 2-n, the image forming apparatus will simply be called "image forming apparatus 2". Moreover, when indicating a network 5a, 5b, 5c, ... as well, the network will simply be called "network 5". This will also be the same for the control unit 10 (FIG. 2, FIG. 4) and storage unit 19 (FIG. 3, FIG. 4).

The upstream server 1 is a server for mainly performing the handling of billing and service of each of the image forming apparatuses 2, regional server 3 and the like. In this embodiment, the upstream server 1 may be configured using a general-purpose device, PC (Personal Computer) or the like.

Moreover, in this embodiment, the upstream server 1 integrates the functions of reading (capturing) documents (text, images). More specifically, the upstream server 1 acquires apparatus information 400 (FIG. 4) from each image forming apparatus 2, and mainly causes the image forming apparatuses 2 and the regional server 3 to share in the execution of processing image data of documents that are captured from the image forming apparatuses 2 in accordance with the flow of processing that is set as the workflow described later. This workflow, as will be described later, may include for example, image processing, OCR (Optical Character Recognition) processing, classification processing, transmission processing of e-mail, shared folders (document boxes, folders for saving files) or transmission to a DMS (Document Management System) and the like for business or office use.

The image forming apparatus 2 is a document reading apparatus such as a MFP, network scanner, document scanner, network FAX, printer with a scanner function and the like. The image forming apparatus 2 may execute application software (hereafter, referred to as simply an "application") for connecting to the upstream server 1.

The regional server 3 is an information processing apparatus that is capable of transmitting and receiving various kinds of data to and from an information forming apparatus 2 that is in the region. In other words, the regional server 3 exists in a region of the intranet network 5 that is able to transfer data from an image forming apparatus 2 with little load. In this embodiment, the regional server 3 may be configured using a general-purpose device, PC (Personal Computer) or the like.

Moreover, in this embodiment, the regional server 3 exists in branch A of the intranet network 5a described above. The regional server 3 also transmits and receives various data to and from the image forming apparatuses 2-1, 2-2 that are connected to the network 5a, and executes shared processing.

Furthermore, the regional server 3 is also able to transmit and receive data to and from the upstream server 1, and to transmit and receive data from the upstream server 1 to and from the image forming apparatuses 2-1, 2-2 on the same branch A. Therefore, the regional server 3 may also include the function of a router or the like.

The network 5 in this embodiment is an intranet or the like that is capable of transmitting and receiving various data at high speed, and is configured by a LAN (local Area Network), dedicated lines, and the like. Moreover, the network 5 may be connected to a WAN such as the Internet (registered trademark), a portable telephone network, and the like.

Figure 2:
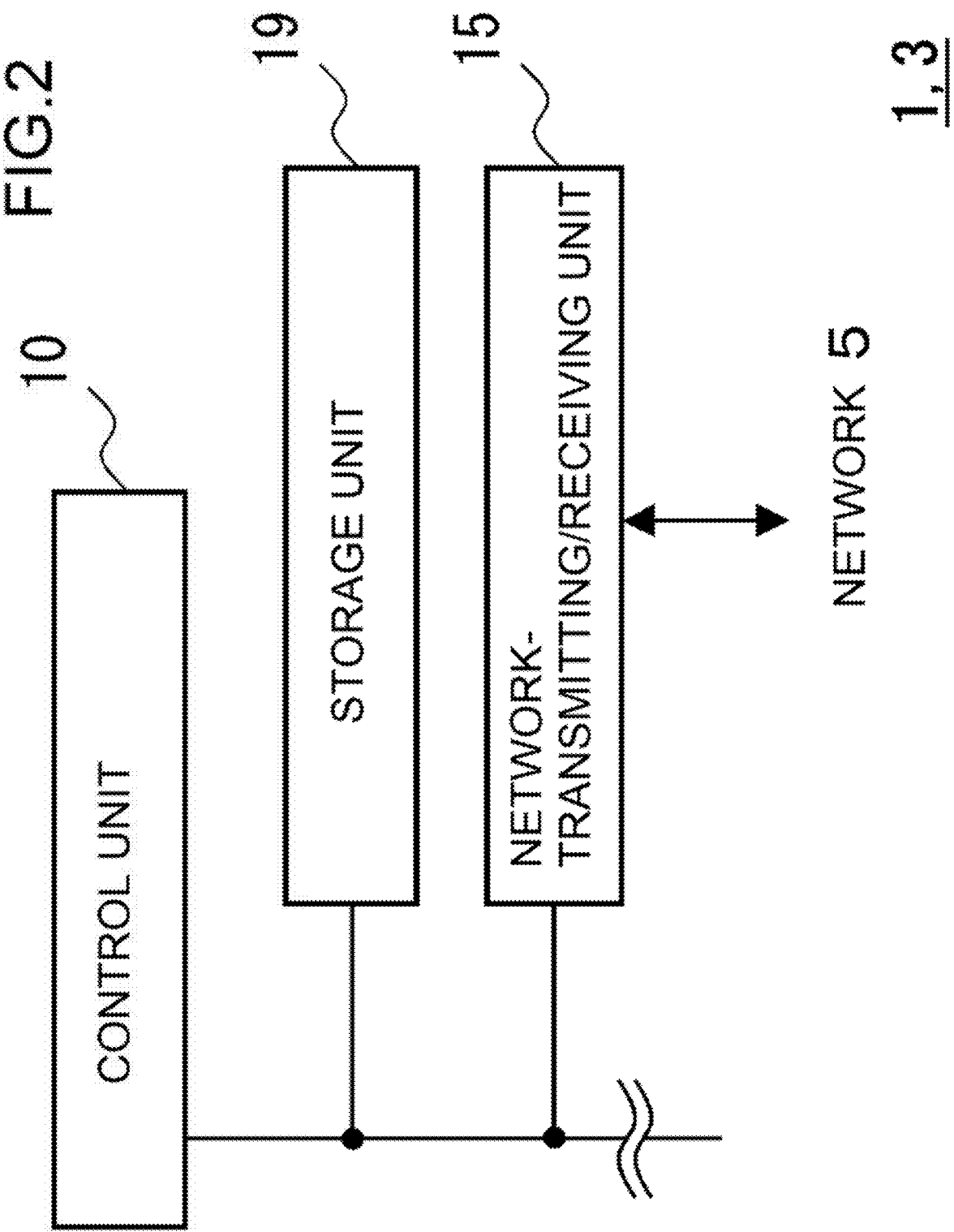
FIG. 2 is a block diagram illustrating the control configuration of the server illustrated in FIG. 1.

Next, FIG. 2 will be used to explain the configuration of the upstream server 1 and the regional server 3. In this embodiment, an example will be explained in which the upstream server 1 and the regional server 3 have the same configuration.

The upstream server 1 and the regional server 3 include a control unit 10, a network transmitting/receiving unit 15 and a storage unit 19.

The control unit 10 is an information-processing unit such as a GPP (General Purpose Processor), CPU (Central Processing Unit), MPU (Micro Processing Unit), DSP (Digital Signal Processor), GPU (Graphics Processing Unit), ASIC (Application Specific Integrated Circuit, processor for special uses), and the like.

The control unit 10 reads a control program that is stored in the ROM, SSD or HDD of a storage unit 19, and by expanding this control program in RAM and executing this control program, is able to operate as each unit of the functional blocks that will be described later.

The network transmitting/receiving unit 15 is a network-connecting unit that includes an LAN board, a wireless transmitting/receiving device and the like for connecting to a network 5.

The storage unit 19 is a storage unit that uses a non-transitory recording medium. The storage unit 19 may include a RAM (Random Access Memory) as the main storage unit. Moreover, the storage unit 19 may include a ROM (Read Only Memory), an eMMC (embedded Multi Media Card), a flash memory such as a SSD (Solid State Drive), a HDD (Hard Disk Drive) and the like as an auxiliary storage unit. In this case, a control program for performing control of an image forming apparatus 2 is stored in an auxiliary storage unit of the storage unit 19.

As will be described later, the storage unit 19 stores the respective data for the upstream server 1 and regional server 3.

Moreover, the control unit 10 may have a built-in RAM, ROM, flash memory or the like.

Next, the configuration of an image forming apparatus 2 will be explained using FIG. 3.

The image forming apparatus 2 includes an image-processing unit 21, a document-reading unit 22, a document-feeding unit 23, a paper-supply unit 24, a network-transmitting/receiving unit 25, an operation-panel unit 26, an image-forming unit 27, a FAX-transmitting/receiving unit 28, a storage unit 29 and the like. Each unit is connected to the control unit 20, and operated and controlled by the control unit 20.

The control unit 20 is an information-processing unit such as a GPP, CPU, MPU, DSP, GPU, ASIC or the like.

The control unit 20 reads a control program that is stored in an auxiliary storage unit of the storage unit 29, and by expanding this control program in a main storage unit, and executing this control program, operates as each unit of the functional blocks to be described later. Moreover, the control unit 20 performs overall control of the image forming apparatus 2 according to specified instruction information that is inputted from an external terminal or from the operation-panel unit 26.

The image-processing unit 21 is a control operation unit such as a DSP (Digital Signal Processor), GPU (Graphics Processing Unit) or the like. The image-processing unit 21 is a processing unit for performing specified image processing on image data; for example performs various image processing such as blank-page detection, enlargement, reduction, rotation, density adjustment, tone adjustment, noise removal, sharpness adjustment, other image improvement and the like.

The image-processing unit 21 stores images that are read by the document-reading unit 22 in the storage unit 29 as printing data. When doing this, the image-processing unit 21 is also able to convert the printing data in file units in a format such as PDF, TIFF and the like.

Moreover, the image-processing unit 21 may also include an OCR function, an OCR accelerating function, and the like. The image-processing unit 21 may also include a function for reading barcodes, dot images and the like. In this case, the image-processing unit 21 is able to output text, figures, tables, barcodes, dot images and the like in file units.

The document-reading unit 22 is a reading unit that reads (scans) set documents. Moreover, the document-reading unit 22 is arranged on top of the main part of the image forming apparatus 2.

The document-reading unit 22 includes a scanner, a platen glass, and a document-reading slit. When reading a document that is set on the platen glass, the document-reading unit 22 moves the scanner to a position that faces the platen glass, and acquires image data by reading while scanning the document placed on the platen glass, and then outputs the acquired image data to the control unit 20.

When reading a document that is fed from the document-feeding unit 23, the document-reading unit 22 moves the scanner to a position that faces the document-reading slit. Then, the document-reading unit 22 reads the document via the document-reading slit in synchronization with the conveying operation for conveying the document by the document-feeding unit 23, and acquires image data. The document-reading unit 22 outputs the acquired image data to the control unit 20.

The document-feeding unit 23 is a feeding unit that conveys a document that is read by the document-reading unit 22. The document-feeding unit 23 is arranged on top of the document-reading unit 22.

The document-feeding unit 23 includes a document-placement unit and a document-conveying mechanism. The document-feeding unit 23 takes out and feeds documents that are placed in the document-placement unit to the document-reading unit 22 in order one sheet at a time by the document-conveying mechanism.

The paper-supply unit 24 is a paper-supply unit that feeds printing paper toward the image-forming unit 27 one sheet at a time. The paper-supply unit 24 is included in the main unit.

The network-transmitting/receiving unit 25 is a network-connecting unit that includes an LAN board, wireless transmitting/receiving device or the like for connecting to a network 5.

The network-transmitting/receiving unit 25 transmits and receives data via a line for data communication, and transmits and receives audio signals via an audio telephone line.

The operation-panel unit 26 includes an input unit such as buttons, a touch panel and the like, and a display unit such as a LCD (Liquid Crystal Display), organic EL display and the like. Moreover, the operation-panel unit 26 is arranged on the front side of the image forming apparatus 2.

The buttons of the input unit of the operation-panel unit 26, are a numeric keypad, start button, cancel button, operation mode switch button, buttons for performing instructions related to executing a job, and the like. The operation modes may include various modes such as for copying, FAX transmission, scanner, network scanner and the like. Moreover, a job includes various kinds of jobs such as printing, transmitting, saving or the like for selected text. The input unit of the operation-panel unit 26 acquires various job instructions for the image forming apparatus 2 from a user. The operation-panel unit 26 may also be used to input or change information for each user according to a user instruction that is acquired from the operation-panel unit 26.

The image-forming unit 27 is an image forming unit that causes an image to be formed on printing paper from data that is stored in the storage unit 29, read by the document-reading unit 22, or acquired from an external terminal according to an output instruction from a user.

The image-forming unit 27 includes a photosensitive drum, an exposing unit, a developing unit, a transferring unit, a fixing unit and the like. The image-forming unit 27, prints a toner image on printing paper by executing an image forming process that includes charging, exposing, developing, transferring and fixing.

The FAX-transmitting/receiving unit 28 is a transmitting/receiving unit that performs the transmission and reception of facsimiles. The FAX-transmitting/receiving unit 28 is able to receive a facsimile from another FAX apparatus via an audio line, save the facsimile data in the storage unit 29 and cause the image-forming unit 27 to form an image. Moreover, the FAX-transmitting/receiving unit 28 is able to convert document data that is read by the document-reading unit 22, or network FAX data that is transmitted from an external terminal to image data, and transmits a facsimile to another FAX apparatus via an audio line.

The storage unit 29 is a storage unit that uses a non-transitory recording medium such as semiconductor memory such as a ROM (Read Only Memory), a RAM (Random Access Memory) and the like, or a HDD (Hard Disk Drive) and the like.

Even in the power-saving state, the storage contents of the RAM of the storage unit 29 may be maintained by a function such as self-refresh or the like.

A control program for performing operation control of the image forming apparatus 2 is stored in the ROM or HDD of the storage unit 29. In addition to this, the storage unit 29 may store account settings of the user. Moreover, areas for document boxes (folders for saving files, shared folders) for each user may also be included in the storage unit 29.

In the image forming apparatus 2, the control unit 20 and image-forming unit 21 may be integrally formed such as in a GPU built-in CPU or the like, or a chip-on-module package.

Moreover, the control unit 20 and image-forming unit 21 may include a built-in RAM, ROM, flash memory or the like.

[Control Configuration of the Information Processing System X]

Here, the control configuration for the information processing system X of an embodiment according to the present disclosure will be explained with reference to FIG. 4.

In the following, an example is explained in which the upstream server 1 as an information-processing server causes the image forming apparatus 2 (document reading apparatus) and regional server 3 (regional information processing apparatus) to perform sharing of processing of the workflow that is a series of tasks. In FIG. 4, the configuration of image forming apparatus 2-1 is illustrated as a representative example of an image forming apparatus 2.

The control unit 10c of the upstream server 1 includes an apparatus-information-acquiring unit 101, and a task-sharing unit 110.

The storage unit 19c (apparatus-information-storage unit) of the upstream server 1 stores apparatus information 400 and workflow information 310.

The control unit 10a of the regional server 3 includes a task-executing unit 130.

The storage unit 19a of the regional server 3 stores document data 330 (data of a document).

The control unit 20 and image-processing unit 21 of the image forming apparatus 2 include an apparatus-information-transmitting unit 201 and task-executing unit 240.

The storage unit 29 of the image forming apparatus 2 stores apparatus information 400 and document data 330 (data of a document).

The apparatus-information-acquiring 101 acquires apparatus information 400 of plural image forming apparatuses 2, and stores that information in the storage unit 19c. In this embodiment, in the example in FIG. 1, the apparatus-information-acquiring apparatus is able to acquire respective apparatus information 400 from image forming apparatuses 2-1 to 2-4.

When doing this, the apparatus-information-acquiring unit 101 correlates and stores apparatus information 400 for each image forming apparatus 2 in a billing and service database based on an ID 301.

The task-sharing unit 110, according to settings for workflow information 310 that is information for a series of tasks for document data that is read by a specified image forming apparatus 2, determines the respective tasks and causes execution to be shared so that the tasks are executed by the image forming apparatus 2 that is at the nearby position in the network 5. When doing this, the task-sharing unit 110 performs determination by referencing the ID 301 and performance information 300 of the plural image forming apparatuses 2 that are stored in the storage unit 19c.

When doing this, the task-sharing unit 110 may perform determination so that the image forming apparatus 2 of the plural image forming apparatuses 2 for which it is indicated in the performance information 300 that it is possible to execute a task corresponding to an installed function, and to which data can be transferred with the least load from the image forming apparatus 2 to which execution of the previous task was shared, is caused to execute the next task.

Moreover, the task-sharing unit 110 may also perform determination so that a regional server 3 that exists in the region of the intranet of network 5 to which data can be transferred with the least load from the image forming apparatus 2 to which execution of the previous task was shared, is also caused to execute tasks.

The task-executing unit 130 is an executing unit that executes tasks for which it is determined by the task-sharing unit 110 that will be executed by the regional server 3.

Moreover, the task-executing unit 130 is also able to acquire output data of each task that is executed by an image forming apparatus 2, and deliver that output data as input data for the next task.

Furthermore, in this embodiment, the task-executing unit 130 is also able to acquire document data 330 from an image forming apparatus 330, and temporarily store that document data 330 in the storage unit 19a.

The task-executing unit 130 is also able to acquire output data and the like of each task of the workflow from an image forming apparatus 2, and temporarily store that output data in the storage unit 19.

The apparatus-information-transmitting unit 201 transmits apparatus information 400 in accordance with a request from the upstream server 1.

Moreover, the apparatus-information-transmitting unit 201 can also transmit document data 330 that is stored in the storage unit 29, and input data or output data of a task to another image forming apparatus 2 or to the regional sever 3 that will execute a task.

The task-executing unit 240 is an executing unit that executes a task that the task-sharing unit 110 determines will be executed by the image forming apparatus 2.

The apparatus information 400 includes performance information 300, ID 301 and position information 302 of the image forming apparatus 2.

The performance information 300 is information related to performance and functions of the image forming apparatus 2. As performance information 300, information, for example, that is related to performance and functions corresponding to the respective processing such as image processing, OCR processing, classification processing, transmission processing is set. For image processing, the performance information 300 includes information such as whether or not there is a function capable of executing processing such as skipping blank pages, page sharing, deskewing (automatic skew correction), border deletion, contrast adjustment, noise reduction and the like, and information about the performance of the processing capability and the like, for example. Moreover, for OCR processing, the performance information 300 includes, for example, information regarding languages for which character recognition is possible, resolution, whether or not recognition of handwriting character is possible, whether or not recognition of tables and figures is possible, version of the recognition engine, recognition speed and the like. Furthermore, for OCR processing, the performance information 300 includes, for example, information regarding whether or not it is possible to recognize one-dimensional, two-dimensional and/or colored barcodes, dot images and the like. For classification processing, the performance information 300 may also include information regarding, for example, classifications such as invoices, vouchers, bills and the like, acquisition of items, whether or not extraction or the like of metadata is possible, and when possible the type of metadata, and the like. Of this, as metadata, the performance information 300 includes whether or not it is possible to acquire information regarding customer ID 301 (identification), company name, name, amount of items, tax and the like, and when possible, information of the type and the like. Furthermore, for transmission processing, the performance information 300, includes, for example, information regarding the e-mail address of a user or group, addresses of document boxes (folders for saving files, shared folders), or DMS application name, address, account ID 301 and the like.

As performance information 300, it is also possible to include information for each processing described above regarding whether or not use is possible according to the hardware state, difference in firmware version, whether or not an application is installed, state of license authorization and the like. In other words, when a function is not usable even though provided in the model of image forming apparatus 2 itself, the performance information 300 may include information that indicates that.

Moreover, as performance information 300, information regarding the language setting of the image forming apparatus 2, customer information, and other information may also be included.

The ID 301 is a unique code for identifying each image forming apparatus 2. In this embodiment, as the ID 301 it is possible to use the serial number, model name or the like of the image forming apparatus 2.

The position information 302 is information that indicates the position of the image forming apparatus 2. The position information 302, for example, may be information that indicates the position in a network 5. More specifically, as position information 302 it is possible to use the position of each intranet such as "branch A", "branch B" or the like illustrated in the example in FIG. 1, position of the IP address, a sub-net mask or the like. Moreover, as position information 302, information regarding the actual coordinates such as the longitude and latitude of the installation location of the image forming apparatus 2, the floor or room in a building, and the like may be used. Furthermore, as position information 302, the data transfer rate with other image forming apparatuses 2 on the network 5 may also be included. Information regarding the relative position on a map of distance based on the topology (structure) of the network 5 may also be used as position information 302. Moreover, information regarding the position that is determined according to the type of user or group of the image forming apparatus 2 may be used as the position information 302.

The workflow information 310 is information that includes settings for the flow of processing for a "workflow" that is a series of tasks for which a user gives an instruction to execute. When this workflow is a scanning workflow related to capturing a document, for example, the workflow information 310 includes settings such as the order of processing the tasks of image processing, OCR processing, classification processing, transmission processing, and for parameter of each task. The workflow information 310, for example, may include descriptions of these settings in a format such as "macro" or script.

Moreover, the workflow information 310 can be set by an application that is installed in the image forming apparatus 2, or by an administrator of the image forming apparatus 2 from the regional server 3 or upstream server 1, or by an administrator of the regional server 3 or upstream server 1, or the like.

The document data 330 is data that is the target of the various processing in the workflow. In this embodiment, an example is described in which the document data 330 is image data of a document that is read by the document-reading unit 22 of a specified image forming apparatus 2. This image data, for example, may be bitmap data such as BMP or the like, bitmap data that is compressed such as TIFF, jpg or the like, PDF (Portable Document Format) data and the like. Moreover, document data 330 may be a collection of image data in page units, and various character data or intermediate data may be added in accordance with the degree of progress of the processing of each of the tasks described above. The document data 330 may also be a collection of plural files instead of a single file. Moreover, the document data 330 may be PDF data or the like that is saved beforehand in a document box of a user of the image forming apparatus 2 or the upstream server 1, or that is acquired from a terminal or the like.

The storage unit 19a of the regional server 3 may include an area for document boxes (folders for saving files, shared folders) for each user.

Moreover, the storage unit 19a may store information related to the performance and functions of the upstream server 1.

The storage unit 19a may include an external storage medium such as various kinds of flash memory, optical recording media and the like.

Here, the control unit 10c of the upstream server 1 may function as the apparatus-information-acquiring unit 101 and task-sharing unit 110 by executing a control program that is stored in the storage unit 19c.

Moreover, the control unit 20 of the image forming apparatus 2 may function as the apparatus-information-transmitting unit 201 and task-executing unit 240 by executing a control program that is stored in the storage unit 29.

Furthermore, the control unit 10a of the regional server 3 may function as the task-executing unit 130 by executing a control program that is stored in the storage unit 19a.

Moreover, each of the units of the upstream server 1, image forming apparatus 2 and regional server 3 described above are hardware resources for executing the image forming method according to the present disclosure.

[Task Sharing Execution Process by the Information Processing System X]

Figure 5:
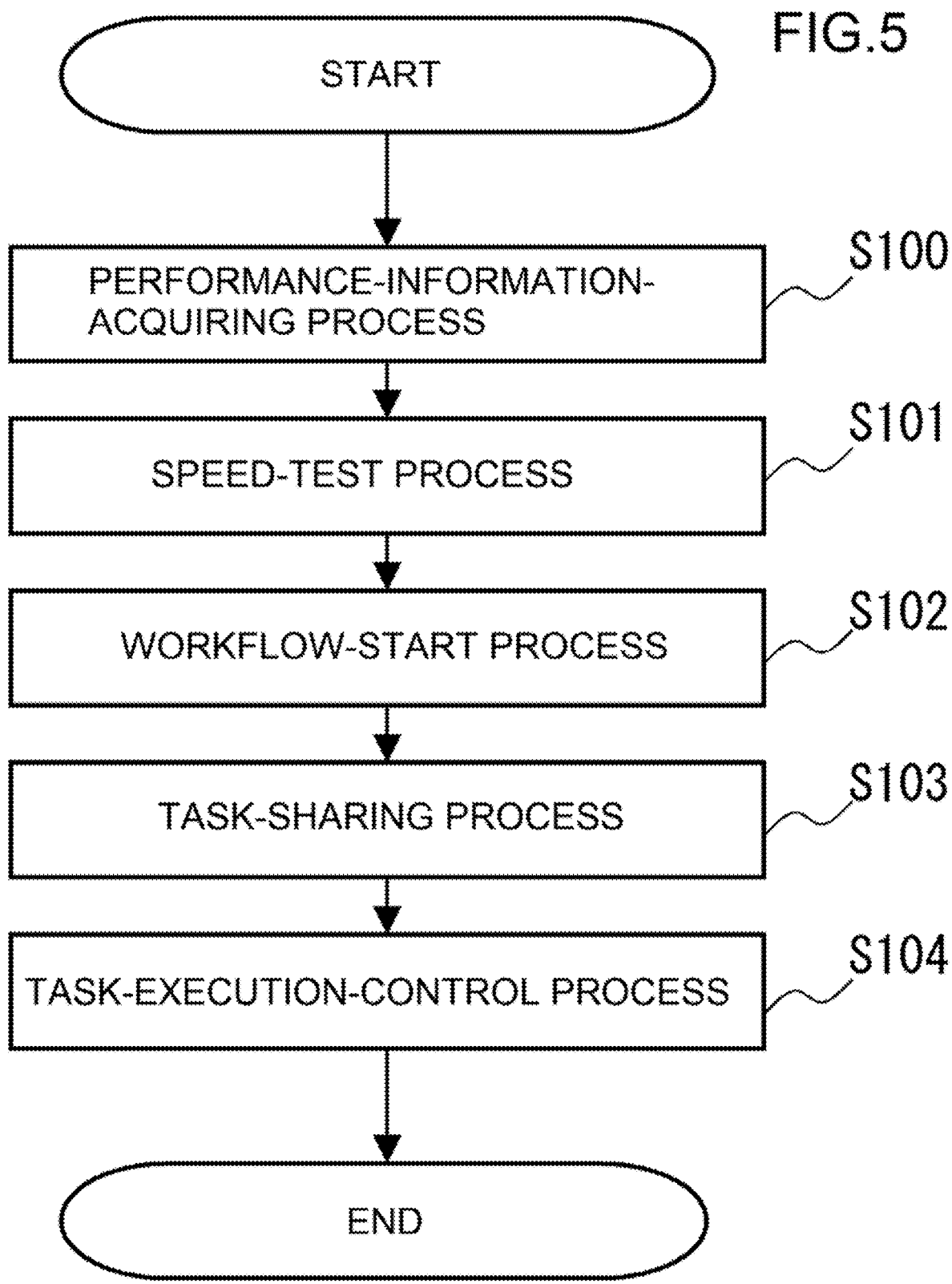
FIG. 5 is a flowchart of a task sharing execution process of an embodiment according to the present disclosure.

Next, the task sharing execution process by the information processing system X of an embodiment according to the present disclosure will be explained with reference to FIG. 5.

In the task sharing execution process of this embodiment, first, the upstream server 1 stores apparatus information 400 of plural image forming apparatuses 2 in the storage unit 19c. Then, the upstream server 1 performs a determination and shares the respective series of tasks for the data of a document that is read for a specified image forming apparatus 2 so as to be executed by an image forming apparatus 2 that is located at the nearby position in the network 5 or by the regional server 3 in accordance with stored IDs 301 and performance information of the plural image forming apparatuses.

In the task sharing execution process of this embodiment, the control unit 10c of the upstream server 1 mainly executes a program that is stored in the storage unit 19c by using hardware resources in cooperation with each of the units. Moreover, the control unit 10a of the regional server 3 mainly executes a program that is stored in the storage unit 19a by using hardware resources in cooperation with each of the units. Furthermore, the control unit 20 of the image forming apparatus 2 and the image-processing unit 21 execute a program that is stored in the storage unit 29 by using hardware resources in cooperation with each of the units.

In the following, details of the task sharing execution process will explained step by step with reference to the flowchart in FIG. 5.

(Step S100)

First, the apparatus-information-acquiring unit 101 of the upstream server 1 and the apparatus-information-transmitting unit 201 of the image forming apparatus 2 perform a performance-information-acquiring process.

The apparatus-information-acquiring unit 101 of the upstream server 1 instructs the respective apparatus-information-transmitting units 201 of the plural image forming apparatuses 2 to transmit apparatus information 400.

The apparatus-information-transmitting unit 201 of the image forming apparatus 2 receives this instruction and transmits the apparatus information 400 that is stored in the storage unit 29 to the upstream server 1.

The apparatus-information-acquiring unit 101 of the upstream server 1 acquires the apparatus information 400 that is transmitted from the apparatus-information-transmitting unit 201 of the image forming apparatus 2, and stores the apparatus information 400 in the storage unit 19c. When doing this, the apparatus-information-acquiring unit 101 correlates the apparatus information 400 with each respective image forming apparatus 2 based on an ID 301, and stores the apparatus information 400 in the billing or service database.
(Step S101)

Next, the task-sharing unit 110 of the upstream server 1 performs a speed test.

The task-sharing unit 110 performs a test transfer of data among each of the image forming apparatuses 2 from which apparatus information 400 was acquired, and measures the data transfer speed. When doing this, the task-sharing unit 110, in the example in FIG. 1, may also measure the data transfer speed for transferring data between each intranet of branch A, branch B and the like. Moreover, the task-sharing unit 110 may also measure the data transfer speed transferring data from each intranet of from the regional server to the upstream server 1. Furthermore, the task-sharing unit 110 may select nearby image forming apparatuses 2 and measure the data transfer speed. The task-sharing unit 110 stores these measured data transfer speeds in the storage unit 19c. When doing this, the task-sharing unit 110 may set and include the transfer speed in the position information 302 of the apparatus information 400 of each respective image forming apparatus 2.
(Step S102)

Next, the apparatus-information-transmitting unit 201 of a specified image forming apparatus 2 performs a workflow start process.

Here, when an instruction from a user for executing a workflow is acquired from the operation panel 26 of a specified image forming apparatus 2 or from a terminal, a workflow execution command is transmitted to the upstream server 1.

Moreover, when performing capture by an image forming apparatus 2, capture of a document is performed by the document-reading unit 22, and the captured document is stored temporarily in the storage unit 29 as document data 330. At this point, the document data 330 may be bitmap data.

This capture may also be performed in parallel execution of a task that will be explained below.
(Step S103)

Next, the task-sharing unit 110 of the upstream server 1 performs a task-sharing process.

More specifically, first, the task-sharing unit 110 references the workflow information 310, the ID 301 of the acquired apparatus information 400, and the performance information 300 for the document data 330 that is read by a specified image forming apparatus 2. Then, the task-sharing unit 110 determines for each task, whether or not it is indicated on which workflow of which image forming apparatus 2 it is possible to execute the respective task. In other words, the task-sharing unit 110 searches for an image forming apparatus 2 for which it is indicated in the performance information 300 that it is possible to execute a task corresponding to an installed function.

Moreover, when doing this, the task-sharing unit 110, in correspondence to the ID 301 and performance information 300 of plural image forming apparatuses 2 that are stored in the storage unit 19c shares tasks with the image forming apparatus 2 whose position in the network 5 is nearby and/or with the regional server 3. When performing this sharing, the task-sharing unit 110 may also take into consideration the performance of the image forming apparatus 2 and regional server 3, the transmitting/receiving speed via the network 5, and the like.

More specifically, the task-sharing unit 110, according to the position information 302, causes an image forming apparatus 2 or the regional server 3 that is capable of executing tasks to execute the next task. When doing this, the task-sharing unit 110 may share execution of the next task with the image forming apparatus 2 or the regional server 3 to which it is possible to transfer data with the least load from the image forming apparatus 2 or regional server 5 that shared execution of the previous task. The task-sharing unit 110 determines this "least load" based on the execution time, scale, type of the task, the data transfer speed, and the like. Therefore, the task-sharing unit 110 may share each task by giving preference to an image forming apparatus 2 and regional server 3 that belong to the same intranet.

In the case of the example in FIG. 1, when an instruction to start a workflow is given with the image forming apparatus 2-1 or the image forming apparatus 2-2 as the specified image forming apparatus, tasks may be shared with other apparatuses among the image forming apparatus 2-1, image forming apparatus 2-2 and regional server 3 that are connected to the network 5a of "branch A". Moreover, when an instruction is given to start a workflow with image forming apparatus 2-3 or image forming apparatus 2-4 as the specified image forming apparatus 2, tasks may be shared with the other apparatus among the image forming apparatus 2-3 and image forming apparatus 2-4 that are connected to the network 5b of "branch B".

The task-sharing unit 110 does not have to select an image forming apparatus 2 or regional server 3 that, even though the distance in the network 5 is near, has a slow data transfer speed, or has a large data transfer load. On the other hand, the task-sharing unit 110 may share a task with an apparatus that is located at a far distance on the network 5 as long as fast data transfer is possible. Furthermore, it is also possible to not allow the task-sharing unit 110 to share a task with an image forming apparatus 2 or regional server that belongs to a different user or group even that the data transfer speed is fast.

Moreover, the task-sharing unit 110 may determine according to the performance information 300 to cause the regional server 3 to execute a task when a function for that task is not mounted in an image forming apparatus 2 or the execution speed for that task by an image forming apparatus 2 is slower than the regional server 3. More specifically, in the case of a task related image process, OCR processing, and transmission processing, for example, when an image forming apparatus does not have a function for executing that task, or when the image forming apparatus has that function but cannot use that function, the task-sharing unit 110 determines to cause regional server 3 to execute the task. Moreover, the task-sharing unit 110, depending on the extent of the processing performance, data transmitting/receiving speed, performance of the regional server 3 and the like, may determine to execute the task by the regional server 3 when execution of the task by the regional server 3 would result is less overall processing time or more efficient processing.

Furthermore, the task-sharing unit 110 may determine to cause an image forming apparatus 2 to execute a task that corresponds to a function that is installed in an image forming apparatus 2. More specifically, in the case of a task related to image processing, OCR processing and transmission processing, for example, the task-sharing unit 110 may determine to execute the task by an image forming apparatus 2 when there is an image forming apparatus 2 that has a function capable of executing that task, and that is able to use that function.

Even though an image forming apparatus 2 has a function capable of executing the task, when that function cannot be used, the task-sharing unit 110 may determine to execute the task by the image forming apparatus 2 after temporarily making that function usable. In other words, the task-sharing unit 110 may make the function usable by temporarily giving license for the application of the image forming apparatus 2 that corresponds to that function, or temporarily installing the application itself. After that, when the function becomes usable, the task-sharing unit 110 determines to execute the task by the image forming apparatus 2.

For tasks that the task-sharing unit 110 determines to share with and execute by the regional server 3, the task-sharing unit 110 instructs the task-executing unit 130 of the regional server 3 to execute the task. More specifically, for example, the task-sharing unit 110 sets macros, scripts and the like of task commands for executing the task by the regional server 3. When doing this, the task-sharing unit 110 may set the macros and scripts after including settings for input data and output data that correspond to various parameters included in the workflow information 310, and settings for executing the task on the apparatus itself. Moreover, when doing this, the task-sharing unit 110 may set a "pipe" as a macro or script setting to correspond to the workflow so that input data and output data are input and output in order.

Furthermore, in the case of a task that the task-sharing device 110 has determined to have executed by an image forming apparatus 2, the task-sharing unit 110 instructs the task-executing unit 240 of that image forming apparatus 2 to execute that task. In this process as well, the task-sharing unit 110 may set macros, scripts and pipes after including settings for input data and output data that correspond to various parameters included in the workflow information 310, and settings for executing the task on that image forming apparatus 2.

(Step S104)

Here, the task-executing unit 240 and/or task-executing unit 130 perform a task-execution-control process.

For the respective tasks that were determined by the task-sharing unit 110 to be executed, the task-executing units 240 of the respective image forming apparatuses 2 and/or the task-executing unit 130 of the regional server 3 issue and execute the macro and script commands described above in order of the settings in the workflow information 310. For example, the task-executing unit 240 issues and executes a task command that was determined by the task-sharing unit 110 to execute by that image forming apparatus 2. Moreover, for example, the task-executing 130 issues and executes a task command that was determined by the task-sharing unit 110 to execute by regional server 3.

As a result, document data 330 is processed, and exchanged as input data and output data between the image forming apparatuses 2 and/or regional server 3. When doing this, the task-executing unit 240 and/or task-executing unit 130 may, in accordance with the pipe described above, acquire output data that is the result of executing the tasks and deliver that output data as input data for the next task. As a result, the task-executing unit 240 and/or task-executing unit 130 process the tasks as workflow of a series of tasks. The task-executing unit 240 and/or task-executing unit 130 may create, transmit and receive this input data and output data as a temporary file, or may transmit and receive data in specified units such as a page or the like of document data 330.

In this way, the task-sharing-execution process of an embodiment according to the present disclosure ends.

[Example of a Task Sharing Process]

Here, a detailed example of the task-sharing-execution process of an embodiment according to the present disclosure will be explained with reference to FIG. 6 and FIG. 7.

FIG. 6 illustrates an example in which for each of the tasks T1 to T5 that are included in workflow information 310, the upstream server 1 causes image forming apparatus 2-1 and regional server 3 to share and execute the series of tasks of workflow information 310.

In this example, the image forming apparatus 2-1 is a high function apparatus that is able to use each of the functions of image processing and OCR processing. Therefor, the task-executing unit 240 of the image forming apparatus 2-1 executes task T1 for skipping a blank page related to image processing, task T2 for reading a barcodes related to OCR processing and task T3 for performing OCR. In this case, task T2 and task T3 may be executed simultaneously in a multitask or the like.

When execution of task T1 to task T3 by image forming apparatus 2-1 ends, the resulting output file is delivered to the task-executing unit 130 of the regional server 3. Then, task T4 for extracting metadata related to classification processing and task T5 for transmitting shared files are executed in order by the task-executing unit 130 of the regional server 3.

As a result, it is possible to execute the workflow with increased processing speed and efficiency by using the regional server 3 and high-function image processing apparatus 2-1 than when executing the workflow by one alone.

FIG. 7 illustrates an example in which for each of the tasks T1 to T5 that are included in the same workflow information 310 as in FIG. 6, the upstream server 1 causes image forming apparatus 2-1, image forming apparatus 2-2 and regional server 3 to share and execute the series of tasks of workflow information 310.

In this example, the image forming apparatus 2-2 does not include each of the function of image processing and OCR processing, and is an apparatus having lower function than the image forming apparatus 2-1. Therefore, after only task T1 for skipping a blank page that is related image processing is executed by the task-executing unit 240 of image forming apparatus 2-2, the outputted image data and the like are delivered to the image forming apparatus 2-1. Then, task T2 and task T3 are executed in order by the task-executing unit 240 of image forming apparatus 2-1, and the outputted image data, character data and the like are delivered to the task-executing unit 130 of the regional server 3. Then, the remaining task T4 and T5 are executed in order by the task-executing unit 130 of the regional server 3.

By using configuration such as described above, it is possible to obtain an effect such as described below.

In the typical example described above, only distributed processing for power saving is performed, so the waiting time for execution becomes long.

However, the information processing system X of an embodiment according to the present disclosure includes plural image forming apparatuses 2 that are document reading apparatuses, and an upstream server 1 that is an information processing apparatus that is able to connect to the image forming apparatuses 2. The image forming apparatuses 2 include an apparatus-information-transmitting unit 201 that transmits apparatus information 400 in accordance with a request from the upstream server 1. The upstream server 1 includes an apparatus-information-acquiring unit 101, a storage unit 19c, and a task-sharing unit 110. The apparatus-information-acquiring unit 101 acquires the apparatus information 400 from the plural image forming apparatuses 2. The storage unit 19c is an apparatus-information-storage unit that stores an ID 301, position information 302 that indicates the position in the network 5, and performance information 300 of each of the plural image forming apparatuses 2. The task-sharing unit 110 determines and shares each of the series of tasks for document data 330 that is read by a specified image forming apparatus 2 so as to be executed by an image forming apparatus 2 that is at the nearby position in the network 5. The task-sharing unit 110 may also determine and share tasks in accordance with the ID 301 and performance information 300 of each of the plural image apparatuses 2 that are stored in the storage unit 19c.

By using this kind of configuration, it is possible to make execution of a series of tasks more efficient, and to reduce the waiting time. More specifically, it is possible to make the execution time of all of the tasks of a workflow faster than when executed by an image forming apparatus 2 alone, and it is possible to reduce the processing load of an image forming apparatus 2.

In other words, the image forming apparatuses 2 and regional server 3 in each branch correlate the respective performance information 300 with the respective ID 301 and transmit that performance information 300 to the upstream server 1. The upstream server 1 on the cloud grasps the arrangement state of all of the apparatuses in each branch, and by making an inquiry to the regional server 3 of the performance information 300 of the list of other image forming apparatuses 2 in the same branch as the specified image forming apparatus 2, is able to perform the optimum distribution of task processing.

Moreover, a feature of the upstream server 1 of an embodiment according to the present disclosure is the task-sharing unit 110 determining to execute the next task by the image forming apparatus 2 of the plural image forming apparatuses 2 to which data can be transferred with the least load. The performance information 300 of this image forming apparatus 2 indicates that execution of tasks corresponding to installed functions is possible, and this image forming apparatus 2 shares the execution of the previous task.

By using this kind of configuration, it is possible to share execution of a series of task based on the load such as the speed, efficiency and the like for transmitting and receiving data. As a result, it is possible to execute a workflow faster than by an image forming apparatus 2 alone, and it is possible to reduce the processing load.

Moreover, a feature of the upstream server 1 of an embodiment according to the present disclosure, is the task-sharing unit 110 also determining to execute a task by the regional server 3 that exists in the region of the intranet of network 5 to which data can be transferred from an image forming apparatus 2 with little load.

By using this kind of configuration, it is possible to share execution of a series of tasks, by sharing and executing tasks by the regional server 3 as well, and thus it is possible to shorten the total execution time and reduce the processing load.

Furthermore, a feature of the upstream server 1 of an embodiment according to the present disclosure is that the ID 301 is a serial number of the corresponding image forming apparatus 2.

By using this kind of configuration, as in the case of billing or a service, it is possible to perform sharing of workflow tasks, and it also becomes possible for the upstream server 1 to perform billing for execution of a workflow.

[Other Embodiments]

In an embodiment according to the present disclosure, even though it is described that a series of tasks is shared by image forming apparatuses 2 and a regional server 3, depending on the performance, all of the series of tasks may be executed by one of the apparatus. In other words, in the case of a low function image processing apparatus, network scanner or the like that does not have a function for skipping blank pages as a function related to image processing, all of the series of tasks may be executed by the regional server 3. Moreover, in the case of a high-function image forming apparatus 2 that is capable of executing all of the functions such a image processing, OCR processing, classification processing, transmission processing, and is able to perform execution at high speed, the image processing apparatus 2 may execute all of a series of tasks. Execution of tasks may also be shared with the upstream server 1.

By using this kind of configuration, it is possible to execute a series of tasks with optimum efficiency and speed in accordance with the installation environment.

Moreover, in the embodiment described above, an example was explained in FIG. 1 in which there is only one regional server 3. However, there may also be plural regional servers 3. Furthermore, in this case, there may be a regional server 3 for each intranet. As a result, tasks may be shared among each of the regional servers 3 and image forming apparatuses 2. Moreover there may also be plural upstream servers 1.

By using this kind of configuration, it is possible to flexibly share tasks with each of the apparatuses, and efficiently process tasks by each of the apparatuses.

Moreover, it is described for the embodiment above that acquiring apparatus information 400 during the performance-information-acquiring process is performed by all of the apparatuses before executing a workflow.

However, the performance-information-acquiring process by the upstream server 1 may be performed by first setting the intranet for sharing, and then performing the performance-information-acquiring process for the image forming apparatuses 2 and regional server 3 of that intranet.

By using this kind of configuration, it is possible to acquire apparatus information 400 according to the state of the apparatuses when executing a workflow, and thus the possibility of efficiently executing the processing of each of the tasks increases.

Furthermore, the technology according to the present disclosure may also be applied to a document reading apparatus other than an image forming apparatus 2. Moreover, configuration may be such that a network 5 is not used, and the document reading apparatus and information processing apparatus are directly connected. In other words, configuration is possible in which a server or the like is used to which a network scanner and scanner are separately connect by USB or the like.

By using this kind of configuration, it is also possible to share and efficiently process tasks at high speed by document reading apparatuses other than image forming apparatuses as well.

Moreover, in the embodiment described above, even though sharing of each of the tasks of a scanning workflow related to capturing a document is described, kinds of workflow other than this can also be handled.

By using this kind of configuration, it is possible to flexibly share tasks and to execute task efficiently and at high speed.

Moreover, the regional server 3, in addition to a control unit 10, maybe also include a control operation unit for executing OCR processing, classification processing and the like at high speed. This control operation unit may be an ASIC, a DSP, and external accelerator and the like for executing specified operations such as an artificial neural network and the like at high speed.

The typical technology described above is technology for performing distributed processing of a job.

Therefore, when executing a workflow of a series of tasks for data of a document that is read by a document reading apparatus, it is not possible to efficiently perform distributed processing. Consequently, the waiting time until execution of the tasks of a workflow is completed becomes long.

With the technology according to the present disclosure, by sharing and executing a series of tasks by an optimum document reading apparatus, it is possible to provide an information processing apparatus that makes execution of a series of tasks more efficient and reduces the wait time.

Moreover, the configuration and operation of the embodiments above are examples, and needless to say it is possible to make appropriate modifications that are within a range the does not depart from the spirit and scope of the present disclosure.

What is claimed is:

1. An information processing apparatus that is capable of connecting with a plurality of document reading apparatuses by a network, the information processing apparatus comprising:
    an apparatus-information-storage unit that stores performance information, an ID, and position of the plurality of document reading apparatuses; and
    a task-sharing unit that determines and shares a series of tasks for data of a document that is read by a specified document reading apparatus so that the respective tasks are executed by document reading apparatuses, of the plurality of document reading apparatuses, that are connected in a same branch as the information processing apparatus in accordance with the position information, the ID and the performance information of the plurality of document reading apparatuses,
    wherein
    the performance information indicates an ability of the respective document reading apparatus to perform one of more of said tasks such that the task-sharing unit can determine whether the respective document reading apparatus can execute the one or more of said tasks;
    the position information indicates a branch of the network on which the respective document reading apparatus resides such that the task-sharing unit can determine whether the respective document reading apparatus is connected in the same branch; and
    the ID is a code unique to the respective document reading apparatus such that the task-sharing unit can uniquely identify the respective document reading apparatus.

2. The information processing apparatus according to claim 1, wherein
    the task-sharing unit determines to execute a next task by an apparatus of the plurality document reading apparatuses for which it is indicated in the performance information that execution of tasks that correspond to installed functions is possible, and to which data can be transmitted from the document reading apparatus that shared execution of the previous task with the least load.

3. The information processing apparatus according to claim 1, wherein
    the task-sharing unit determines to also execute the tasks by a regional information processing apparatus that exists in a region of the network and to which data can be transferred from the document reading apparatus with little load.

4. The information processing apparatus according to claim 1, wherein
    the ID is a serial number of the corresponding document reading apparatus.

5. An image processing system that includes a plurality of document reading apparatuses connected to an information processing apparatus by a network; wherein
    each of the document reading apparatuses comprises an apparatus-information-transmitting unit that transmits, to the information processing apparatus, apparatus information that includes performance information, an ID, and position information of the respective document reading apparatus in accordance with a request from the information processing apparatus;
    the information processing apparatus comprises:
    an apparatus-information-acquiring unit that acquires the apparatus information from the plurality of document reading apparatuses;
    an apparatus-information-storage unit that stores the plurality of apparatus information that is acquired by the apparatus-information-acquiring unit; and
    a task-sharing unit that determines and shares execution of the respective tasks of a series of tasks for data of a document that is read by a specified document reading apparatus so that a document reading apparatus, of the plurality of document reading apparatuses, which is connected in a same branch of the network as the information processing apparatus executes a task in accordance with the position information, the ID and the performance information that are stored in the apparatus-information-storage unit for each of the plurality document reading apparatuses,
    wherein
    the performance information indicates an ability of the respective document reading apparatus to perform one of more of said tasks such that the task-sharing unit can determine whether the respective document reading apparatus can execute the one or more of said tasks;
    the position information indicates a branch of the network on which the respective document reading apparatus resides such that the task-sharing unit can determine whether the respective document reading apparatus is connected in the same branch; and
    the ID is a code unique to the respective document reading apparatus such that the task-sharing unit can uniquely identify the respective document reading apparatus.

6. An information processing method that is executed by an information processing apparatus that is connected to a plurality of document reading apparatuses by a network, and causes the information processing apparatus to:
    store performance information, an ID and position information of each of the plurality of document reading apparatuses; and
    determine and share execution of respective tasks of a series of tasks for data of a document that is read by a specified document reading apparatus so that a document reading apparatus, of the plurality of document reading apparatuses, which is connected in a same branch of the network as the information processing apparatus executes a task in accordance with the position information, the ID and the performance information that are stored for each of the plurality document reading apparatuses, wherein the performance information indicates an ability of the respective document reading apparatus to perform one of more of said tasks such that the task-sharing unit can determine whether the respective document reading apparatus can execute the one or more of said tasks;

the position information indicates a branch of the network on which the respective document reading apparatus resides such that the task-sharing unit can determine whether the respective document reading apparatus is connected in the same branch; and the ID is a code unique to the respective document reading apparatus such that the task-sharing unit can uniquely identify the respective document reading apparatus.

* * * * *